United States Patent Office 3,160,759
Patented Dec. 8, 1964

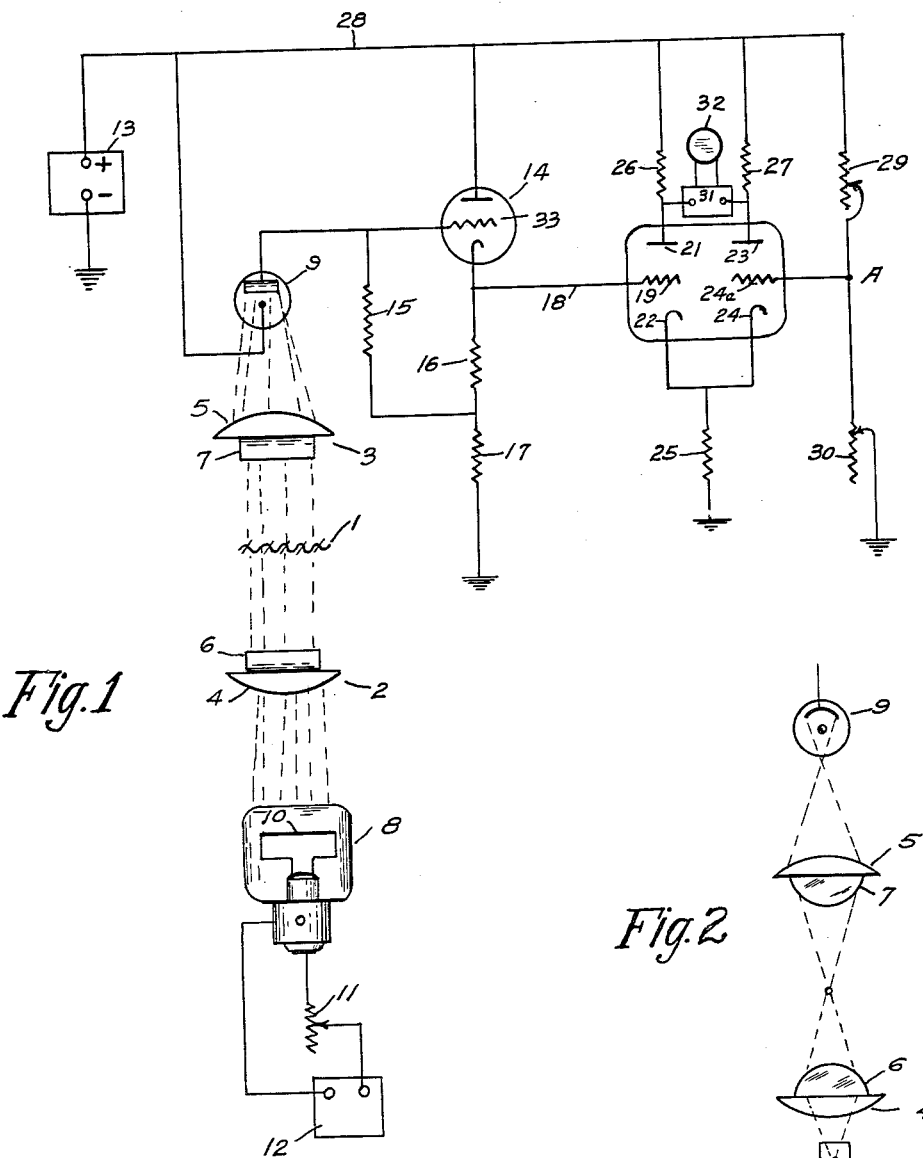

3,160,759
PHOTOSENSITIVE FABRIC INSPECTION SYSTEM
John W. Ward, Charlottesville, Va., assignor to Specialties
Incorporated, Syosset, N.Y., a corporation of New York
Filed Aug. 14, 1961, Ser. No. 131,440
6 Claims. (Cl. 250—219)

This invention relates to testing devices and inspection systems and has especial reference to the testing of fabrics and other sheet material for flaws.

In manufacturing fabrics, for example, it has been customary to have the product visually inspected by observers. This procedure is very tiring, however, and often results in defective goods escaping notice of the inspectors, due to reduction of visual acuity, inattention, or for other reasons. Another deficiency of human inspection is that the rate of travel of the fabric or other sheet is limited since the human eye cannot reliably detect flaws if the rate of travel is faster than a predetermined speed which in many cases is around 120 feet per minute.

In order to overcome the above and other objections, I have conceived and constructed an inspection device or system which will inspect moving webs of various materials such as paper, and fabrics, without the necessity of constant visual inspection by an operator.

An object is to provide an inspection device which will produce a visual, audible, or other signal when a flaw in a fabric is sensed by the device. In this application it is intended that the word "fabric" shall also encompass sheets of paper, plastic, screening, textiles generally, and similar products or materials.

Another object is to provide a device for testing fabrics for missing threads or material, for portions of abnormal thickness or thinness, for small or large slits or apertures, and for other defects.

A further object is to provide a device for testing fabrics moving at relatively fast speeds.

An additional object is to provide a device for testing fabrics by light transmitted therethrough, rather than by reflecting light.

Other objects will be apparent in the following description.

In the drawings:

FIGURE 1 is a schematic representation of a system for testing fabrics or other sheets for flaws, by means of photosensitive means, the sensor being seen from the front.

FIGURE 2 is a side view of the optical system of the system of FIGURE 1.

In FIGURE 1, fabric 1 is moved in a direction perpendicular to the plane of the paper, by means of drive rollers not shown. Combination lens 2 is suitably supported below fabric 1 and similar lens 3 is supported vertically above lens 2, on the opposite side of the fabric. These lenses have respective spherically curved elements 4 and 5 and attached cylindrically curved elements 6 and 7 so that a narrow band or stripe of light from electric lamp 8 is projected on the under surface of the fabric by lens 2 and an expanded image of transmitted light is concentrated on photocell 9 by means of lens 3. Lamp 8 preferably has a filament having a straight portion 10 in order to help form a narrow elongated image. This lamp is supplied current through variable impedance 11 by means of connected battery or other current source 12 which preferably provides regulated voltage.

The photocell 9 is connected in a circuit as shown. Current source 13 may be a battery, generator, power lines, or the like and preferably provides regulated or substantially unvarying voltage. The photocell is connected in the grid circuit of amplifier tube 14 and in series with resistor 15 which is connected between resistors 16 and 17, as indicated. The latter resistor is connected to ground. By means of cathode follower conductor 18 the filament of tube 14 is connected to grid 19 of twin triode 20 having associated anode 21, grid 19 and cathode 22 and also associated anode 23, grid 24a, and cathode 24. The cathodes 22 and 24 are connected together and resistor 25 is connected between the cathodes and ground. Resistors 26 and 27 are connected between respective anode 21 and positive line 28 and anode 23 and positive line 28. This positive line is connected to ground through resistors 29 and 30 the junction A of which is connected to grid 24a. Amplifier 31 is connected between the anodes 21 and 23; and bell, lamp, instrument, or other indicating device 32 is connected to amplifier 31.

In operation, the variable resistors 29 and 30 are adjusted to provide a desired reference potential at junction A. Resistors 26 and 27 and other resistors in the circuit may also be made adjustable if desired. It will be seen that the parallel-connected elements 26, 21, 22 and 27, 23, 24, together with amplifier 31 constitute a bridge so that the potentials of grids 19 and 24a may be adjusted normally to cause zero current flow through the amplifier. If, however, the light striking photocell 9 is changed in intensity the potential of grid 33 of tube 14 will be changed and accordingly the current traversing the leg of the bridge comprising elements 26, 21, 22 will be changed as a result of variation of current resulting from change of the potential of grid 19. The bridge will then be unbalanced to a degree depending upon the intensity of illumination of photocell 9. The adjustments and components can be so chosen that alarm or indicator 32 will register a defect in the fabric for a predetermined change of illumination of the photocell.

An important point of difference between my testing system and prior devices is that I transmit light through the fabric rather than to reflect it from the fabric surface. Prior devices operating in the latter manner have not been satisfactory since the various colors and shadings of printed or patterned fabrics and others having various designs have so confused the flaw testing equipment that it has been quite unsatisfactory. In my system, however, I use the spaces between the threads or filaments to transmit the light and if there is a broken or missing thread a greater degree of illumination is passed to the photocell, regardless of the color of the threads which may be dyed. Likewise, if there is extra heavy thread or more closely packed threads in any spot the light reaching the photocell is thereby reduced and the bridge will be unbalanced in this case likewise.

I have found that a relatively narrow stripe of light approximately one inch long will sense surprisingly small flaws and the fault indicators are quite reliable. The system can be adjusted easily so that small variations in the fabric do not cause indications of flaws when the flaws are below a predetermined magnitude, either for lessened or increased tightness of weave or thickness of thread. In practice, I use a plurality of such sensing systems to inspect or sense the whole width of the fabric which is moved through the light beams in any suitable manner. By sensing small widths the desired sensitivity and reliability are obtained without complicated scanning means.

In using my system I prefer to adjust the various impedances, light intensity, or other variable factors so that light transmitted through the material of the fabric strands or threads will not be effective in unbalancing the bridge sufficiently to cause an indication of a flaw but only the light passing through the apertures or interstices between the threads is effective in determining when a flaw is modifying the effective light beam. In this way the dye content or other variations in color or opacity of the threads will not be the controlling factor in my flaw testing system. The operation of my system, accordingly provides far more accurate and reliable results than prior systems which have not employed this principle.

I prefer to align the narrow stripe of light substantially parallel with the weft threads of fabric under test.

What I claim is:

1. In a system for testing fabrics, a lamp for producing light, lens means for directing light from said lamp in a relatively narrow stripe against said fabrics; a photocell for receiving light passed through interstices between threads of said fabrics, lens means for spreading light passed through said interstices over the active surface of said photocell, and means including electrical circuit means for indicating flaws in said fabrics, said electrical circuit means being connected with said photocell, and said lens means each comprising a cylindrically curved lens and a spherically curved lens.

2. In a system for testing fabric, a lamp for producing light, lens means for directing an elongated stripe of light against said fabric with the long axis of said stripe substantially parallel with the weft threads of said fabric, a photocell for receiving light passed through interstices of said fabric, and means including electrical circuit means connected with said photocell for indicating flaws in said fabric, said circuit means including a bridge, an amplifier connected with said bridge, and an indicating device connected with said amplifier.

3. In a system for testing fabric, a lamp for producing light, lens means for directing an elongated stripe of light against said fabric with the long axis of said stripe substantially parallel with the weft threads of said fabric, a photocell for receiving light passed through interstices of said fabric, and means including electrical circuit means connected with said photocell for indicating flaws in said fabric, said circuit means including an amplifier connected with said photocell, a bridge connected with said amplifier, another amplifier connected with said bridge, and an indicating device connected with said other amplifier.

4. In a system for testing fabric, a lamp and means for collecting light therefrom into an elongated narrow area on one side of said fabric, the long axis of said area being substantially parallel with weft threads of said fabric, light-sensitive means on the other side of said fabric and positioned to receive light passed between said weft threads, and electrical means connected with said light sensitive means for producing responses indicative of flaws in said fabric, said light collecting means comprising a substantially spherically curved lens and a substantially cylindrical lens having its axis at right angles to the axis of said spherically curved lens.

5. In a system for testing fabric, a lamp and means for collecting light therefrom into a narrow elongated pattern directed toward one surface of said fabric, said elongated pattern being substantially parallel with the weft threads of said fabric, means for collecting light passed through interstices of said fabric and for spreading said light, light sensitive means for receiving the spread light directed away from the opposite surface of said fabric, and electrical means connected with said light sensitive means for producing responses indicative of flaws in said fabric, said light collecting and light spreading means each comprising a combination spherically curved lens and cylindrical lens having its axis at right angles to the axis of said spherically curved lens.

6. The system as described in claim 5, said combinations having the cylindrical lenses nearer the fabric than the spherically curved lenses.

References Cited by the Examiner
UNITED STATES PATENTS

| | | | |
|---|---|---|---|
| 2,429,331 | 10/47 | Sachtleben | 88—14 |
| 2,510,347 | 6/50 | Perkins. | |
| 2,920,209 | 1/60 | Asten | 250—239 |
| 2,966,593 | 12/60 | Leimer et al. | 250—219 |
| 3,001,080 | 9/61 | Neil | 250—219 |

RALPH C. NILSON, *Primary Examiner.*

WALTER STOLWEIN, *Examiner.*